United States Patent Office 2,963,376
Patented Dec. 6, 1960

2,963,376

PROCESS OF TREATING COMMINUTED MEAT PRODUCTS

John M. Hogan, Oak Lawn, and Jack F. Beuk, Hinsdale, Ill., assignors to Swift & Company, Chicago, Ill., a corporation of Illinois No Drawing. Filed July 14, 1958, Ser. No. 748,180

11 Claims. (Cl. 99—187)

The present invention relates to canned meats and more particularly to meat products which are subjected to a process of grinding, chopping or some other form of comminution prior to further processing. More specifically, our invention relates to new canned comminuted meat products which possess improved properties of consistency, homogeneity and stability, and the method of manufacture thereof that utilizes the enzymic action of proteolytic enzymes.

Comminuted meats which have been processed and packed as shelf-stable, canned products in glass or metal containers are susceptible to separation of the meat components of protein fat and moisture. The separation is especially noticeable in those products which have been packed in glass containers. Free liquid is visible, and frequently the fat has coalesced into fat pockets. Consequently, there are many products which are not susceptible to processing into shelf-stable items because of the separation of serum and fat induced by sterilization at elevated temperatures. The protein portion of the meat contracts and exudes fluid, thereby producing the effect known as syneresis, which is an ever-present problem in the canned meat packing field.

For a long time it has been the desire of the industry to produce canned shelf-stable meat spreads and fluid meats for consumption by convalescents, infants, and military personnel, whereby the consumer can withdraw the product from its container by means of a straw. However, known processing techniques have not permitted the manufacture of these items because of the inability to stabilize and minimize syneresis of the comminuted meat suspension.

Many attempts have been made to overcome the separation of components of comminuted meat products which are fluid, semi-fluid, and spreadable, such as fluid meats, baby foods, and meat spreads. Such attempts have been directed to mechanical-thermo treatments wherein the product has been subjected to mechanical subdivision of the component materials followed with various heat treatments, or the use of additives for absorbing free moisture which arises from syneresis, or by chemical treatments such as emulsifiers to emulsify the fat and moisture with the protein component. These previous treatments have not been completely satisfactory because of failure to condition the protein fraction of the comminuted meat mixture and thereby overcome the clumping or shrinking characteristics of protein when subjected to sterilization temeperatures. We have found, however, that when a partial digestion of the meat protein is effected by a proteolytic enzyme and the change is manifested by an increase in the soluble nitrogen, then the resultant product will be stabilized against syneresis.

A principal object of our invention is to provide canned food products comprising essentially comminuted meats which do not undergo separation of components.

Another important object of our invention is to provide a simple and inexpensive process for increasing the stability of canned food products made from comminuted meat.

A further object of the invention is to control enzyme effected proteolysis in a manner such that the treated meats are rendered stable and easily assimilable without otherwise being modified so as to be disagreeable to sight, touch, taste or smell.

In general, the present invention relates to a method whereby comminuted food products are produced which are resistant to separation of individual components by treating comminuted meat with a stabilizing amount of a proteolytic enzyme. We are, therefore, able to combine individual prior art mechanical, and heat processes and thereby obtain unexpected and unobvious results, which have not heretofore been obtained. By this process, new canned comminuted meat products having variations in fat, protein and moisture contents over a wide range are obtained.

More specifically, the invention comprises incorporating in an aqueous comminuted meat suspension with or without flavoring additives, a stabilizing amount of a proteolytic enzyme, heating the mixture to a temperature and for a time sufficient to activate the enzyme, and then processing the so-treated meat to inhibit enzymic activity. In the case of canned products, retorting is employed for inhibition of the enzyme.

Our invention is based on the discovery that small amounts of proteolytic enzymes can be used to modify the behavior of meat protein emulsions without sufficient digestion of the meat protein to produce bitter flavors which generally result from the more complete digestion of proteins. Meat proteins normally coagulate when heated and even though coagulation has occurred to apparent completion, the heat-coagulated protein still has residual binding and shrinking power when it is subjected to additional heat, such as in sterilization of canned products. In the instant invention, the mild proteolytic enzyme treatment is employed to modify the tendency of coagulated protein to reclump and shrink upon reheating and eliminates syneresis in the canned products.

The treatment of comminuted meat foods with the proteolytic enzyme should be carried out under conditions which will not effect excess hydrolysis or digestion of the proteins. Prior art processes concerned with proteolytic enzyme treatment involve treatment of the meat to the stage of proteose and peptone formation wherein development of bitter flavor results. Procedure in accordance with the instant invention involves only a slight digestion of the protein without the development of objectionable flavors. Our process is of economic importance in the meat canning art, since the treated meats undergo no decrease in nutritional value and the method is simple, requiring no apparatus other than that customarily found in a meat processing plant. A further advantage lies in the fact that the proteolytic enzymes act at the normal hydrogen ion concentration of meat, that is, at a pH ranging from about 5.0 to about 7.0.

Food products prepared according to our invention embody many advantages to both manufacturer and consumer. Manufacturing processes are simpler and more efficient. Syneresis is substantially absent in our products. The canned meats retain the flavor and nutritional characteristics of fish, meat or fowl, tastily seasoned, as the case may be, since only very small amounts of proteolytic enzymes are incorporated therewith. The remarkable effect of such small amounts of proteolytic enzymes was wholly unexpected.

Any one or more of various proteolytic enzymes, singly or in combination, which are effective at a pH value from about 5.0 to about 7.0 may be employed in carrying out this invention. A commercial enzyme preparation is normally used. For example, enzymes of animal origin such as chymotrypsin, trypsin, cathepsin, and pancreatin; enzymes of plant origin such as those commonly known as bromelin, ficin, and papain; enzymes of mold origin such as those derived from *Aspergillus oryzae, Aspergillus niger, Aspergillus alliaceus,* and *Aspergillus wentii;* and those derived from the overall culture of bacterial organisms such as *Bacillus mesenteroides, Bacterium subtilis,* and *Clostridium welchii* may be used. Of the various enzymes which are adapted for use in our invention, we prefer to use those of plant origin.

Other proteolytic enzymes can be used in the practice of our invention, although the foregoing list illustrates the broad group. Suitable enzymes are derived from various sources and are readily prepared in concentrated form by known methods. The activity of various enzymes differs and since the proportion or quantity used depends upon their activity, such proportions or quantities together with the length and degree of treatment can be specified only in particular cases. The activity and consequently the amount to be employed can readily be determined by testing in each case. It will be recognized that the character of the enzyme and the degree of concentration may be varied to meet the requirements of the particular case.

The types of canned comminuted meat products that are to be produced and their protein-fat-moisture compositions determine the extent of treatment. Generally, there is no exact line of division which separates conditions favoring enzyme activity and those which do not favor it or cause inactivation. On the contrary, conditions of time and temperature which promote the activity of some proteolytic enzymes overlap the conditions which cause inactivation of others to a very considerable extent. Therefore, it will be understood that the time of treatment, the temperature of treatment, and the concentration and activity of the enzyme solution are all variable and are adjustable to secure the desired stabilization. Thus, our invention permits the processing of canned comminuted animal tissue by a wide variety of treatments.

The enzymes must not be allowed to act on the meat to the conclusion of their natural operation. Instead, we follow within a short period of time, depending upon specific conditions as hereinafter explained, with an inactivating operation which inhibits the action of the proteolytic enzymes on the meat product.

The proteolytic enzymes which are utilized in the instant invention may be introduced into the meat by simple admixture of the enzyme in a liquid carrier during or subsequent to comminution of the meat, or the desired quantity may be introduced into carcass meat to be used in the preparation of comminuted meat products by post-mortem injection into a carcass or by ante-mortem injection of an aqueous solution of the proteolytic enzyme or enzymes into the live animal prior to slaughter. This ante-mortem injection method for distributing proteolytic enzymes throughout the meat is disclosed in co-pending application Serial No. 476,832 filed December 21, 1954, which fully describes and claims the said process. Briefly, it is the introduction into the vascular system of the live animal of a solution of the proteolytic enzyme just prior to slaughter whereby the enzyme is efficiently distributed throughout the entire animal tissue. Post-mortem injection is another possible means for introducing the enzyme into carcasses.

The product having proteolytic enzyme present therein by any of the methods above enumerated is subjected to a temperature treatment within the range of enzyme activity but above refrigeration temperature, preferably above about 50° F. and not substantially in excess of 210° F., and maintained at such temperature for a sufficient length of time to permit the enzyme to act upon the meat whereby the desired stabilization is effected. The temperature may then be raised to a point sufficiently high to raise all portions of the meat to an enzyme inactivating temperature and avoid excessive action on the tissue.

The composition of the products of this invention may vary in general from about 4.1–14.5% protein, 1.2–41.4% fat, and from 46.2–92.1% moisture. Fluid meats may vary in protein from about 9–18%, fat from about 7–12%, and moisture from about 70–84%. Meats for babies (strained and chopped) may have variations in protein content from about 10–16%, fat 2–8%, and moisture from about 75–86%. The meat spreads may vary in protein content from about 10–18%, fat from about 25–40%, and moisture from about 35–65%. The aforementioned composition ranges may be further modified by the addition of salt (NaCl) and other flavoring additives. Similarly, other non-meat additives such as fruits and cereals may be combined with the basic comminuted meats to yield nutritious meat items which may be characterized by emulsion stability.

In order to enable those skilled in the art to fully understand the nature of our invention, the following illustrations are given of our new food products and the method of preparing them. It is understood, however, that the proportions of the various ingredients, the various manipulative details, and the nature of the product obtained may be all varied without departing from the spirit of our invention. The following examples, therefore, are to be taken in an illustrative rather than a limitative sense, the scope of our invention being determined by the appended claims.

EXAMPLE I

*Fluid ham*

One hundred pounds of ham is comminuted in a silent chopper and the chopped product admixed with 90 pounds of water. Papain in a 5% aqueous solution is added at the rate of 20 mg. per pound of meat to the ham-water slurry. The slurry is continuously agitated and heated to 150° F. to activate the enzyme and the heating is continued for one hour. After the heating period the slurry is passed through a rotary hammer mill having screen openings of 0.033 inch for finishing. The recomminuted product is deaerated, canned and retorted at 235° F. for 65 minutes. A like quantity of meat without enzyme is subjected to the same steps for treatment. Comparative examination of the products after retorting reveals that the enzyme-treated material is very fluid and free of syneresis whereas the product without enzyme shows coagulation and separation of fat and water thereby indicating syneresis.

It is apparent from the examination of these products that our controlled enzymatic treatment of finely comminuted meat enables the production of a shelf-stable liquid meat item which has not heretofore been produced satisfactorily. Extended storage of samples of the products at varying temperatures ranging from refrigerator to 150° F. reveals the unsatisfactory nature of the untreated product whereas products treated in accordance with this invention possess a desirable stability. The untreated product is unsatisfactory for its intended use because of clumping whereas examination of the enzyme-treated material shows total freedom from syneresis and that the suspension is stable, homogeneous, and possesses the same fluidity as the product has prior to the sterilizing treatment. The finished products contain 9.5% protein, 9.1% fat, 77.3% water, and 1.5% salt. About 18% of the total nitrogen in the nontreated portion is in heat soluble form whereas the enzyme treated portion has about 30% of the total nitrogen in heat soluble form.

EXAMPLE II

*Fluid beef*

A meat-water slurry of 100 pounds of finely chopped beef and 95 pounds of water is prepared. The aqueous-meat slurry is divided into two equal portions and an aqueous solution of bromelin is added at the rate of 40 mg. per pound to one portion. The subsequent treatment of both portions is the same as for Example I. The portion without enzyme has about 20% of the total nitrogen present in heat soluble form. The enzyme treated portion has about 45% of the total nitrogen in heat soluble form. A homogeneous stable fluid beef product results. Analysis is:

|  | Percent |
|---|---|
| Protein | 11.4 |
| Fat | 8.1 |
| Water | 75.5 |
| Salts | 0.9 |

EXAMPLE III

Fluid chicken

A shelf-stable fluid chicken product is prepared by admixing 27.5 pounds of cooked chicken meat with 30 pounds of broth and 20 pounds of giblet gravy having 15% solids. The aqueous mixture is then milled through a screen having 0.033 inch openings and ½ pound monosodium glutamate and .5 pound salt are added as flavoring agents. The complete mixture is then heated in a steam jacketed kettle to a temperature of 150° F. An aqueous solution of ficin is added in an amount sufficient to furnish 10 mg. enzyme per pound of meat. The meat slurry containing the enzyme is then held at 150° F. for one hour with continuous agitation. At the end of the heating period the aqueous meat slurry is milled, deaerated, canned and retorted at 235° F. for 70 minutes. The finished product has a protein content of 14.0%, 10.3% fat, and 75.0% moisture, with 45% of the total nitrogen in heat soluble form. Visual examination of the product shows that the product is free of syneresis, smooth, homogeneous and without bitter flavor. A slight thickening of the product occurs upon standing, but this apparent increase in viscosity is easily overcome by simply shaking at room temperature. Similar preparations not treated with the enzyme set up into a heavy gelatinous mix with many clumps of coagulated protein dispersed throughout. Redispersion of the coagulated portions of this material cannot be effected by shaking.

EXAMPLE IV

Meat for babies

A strained lamb preparation having a protein content of 13.1%, fat content of 6.0% and moisture content of 79.6% is prepared by grinding and chopping lamb in a silent chopper and adding a 5% aqueous solution of papain in an amount of 10 mg. of enzyme per pound of meat during the chopping so as to have the enzyme evenly distributed throughout the mass. The comminuted meat is then transferred to a steam jacketed kettle and sufficient water is added to cover the meat. The aqueous meat slurry is then heated to 160° F. with agitation. After holding at this temperature for a period of 15 minutes the slurry is heated to boiling and held at the boiling temperature for 20 minutes. A gross separation of the solids is made from the liquid for the purposes of standardizing the solids content of the finished product. After adjustment of the solids the slurry is then milled to final particle size. After deaeration and packing in glass containers the canned product is given a sterilization treatment by retorting at 235° F. for 70 minutes. Comparative examination of samples from similar preparations without enzyme incorporated during the heating period shows that there is a decided improvement in the fluidity, homogeneity and stability of the enzyme treated preparation. Slight clumping of the protein is noticeable in the non-enzyme treated product along with small lakes of fat.

EXAMPLE V

Chopped meat for juniors

A strained-chopped pork item having 18.4% protein, 6.9% fat and 73.4% moisture is prepared by treating a finely chopped portion of pork with an aqueous solution of bromelin in an amount of 20 mg. per pound of meat by heating the finely chopped meat at 165° F. for 10 minutes followed by boiling for 10 minutes to inactivate the enzyme. The so-treated fine portion is then admixed with coarsely ground pork which has been precooked to fully coagulate the meat protein. Equal portions of the finely chopped enzyme treated meat are admixed with the rough chopped or coarsely chopped fully cooked pork, then deaerated and canned, followed by sterilization of the packed material at 235° F. for 70 minutes. Similar product without enzyme treatment is extremely difficult to stabilize because of the great disparity in particle size between the strained and chopped meat portions. Syneresis is overcome by treating the strained portion with enzymes thereby stabilizing the aqueous meat suspension against fat and liquid separation. The enzyme treated strained chopped pork had 25% of the total nitrogen of the product in heat soluble form, whereas the untreated preparation had a heat soluble nitrogen content of 18% of the total nitrogen.

EXAMPLE VI

Chopped meat for juniors

The proteolytic enzyme ficin is used in the preparation of strained-chopped veal having a protein content of 19.0%, a fat content of 2.3% and a moisture content of 77.4%. The strained veal portion is treated with an aqueous solution of ficin in an amount to furnish 7.5 mg. enzyme per pound of meat. The enzyme containing meat is held at a temperature of 155° F. for 30 minutes. Inactivation of the enzyme at the end of the treating period is had by boiling the meat. Significant difference between treated and untreated strained-chopped veal preparations is apparent upon visual examination of the finished product. The finished product without enzyme treatment has a heat soluble nitrogen content of 18% of the total nitrogen. The enzyme treated veal preparation has a concentration of heat soluble nitrogen equal to 26% of the total nitrogen content.

EXAMPLE VII

Meat spread

A shelf-stable meat spread of the Braunschweiger type is prepared from 105 pounds of pork liver, 95 pounds of skinned neck fat and 5 pounds of bacon ends and pieces with salt, sugar, spices, sodium nitrate and sodium nitrite added. The pork liver is chopped fine in a silent chopper along with the salt, sugar, spices and sodium nitrite and sodium nitrate. Aqueous solutions of papain and bromelin are added to furnish 25 mg. each enzyme per pound of finished product. The fat is then added and chopped in thereby blending the complete mixture. After 5 minutes of continuous chopping of the meat-fat mixture the mix is then filled into glass containers and vacuum sealed. The containers are sterilized in a retort by holding for 1 hour in 160° F. water under 10 pounds pressure and then treating for 1 hour at 30 pounds steam pressure and 235° F. Analysis of the product shows 44.2% moisture, 35.9% fat, 16% protein and 2.8% salt. Heat soluble nitrogen is present as 35% of the total nitrogen of the finished product. A similar quantity of raw materials is compounded into a finished meat spread but is not treated with the proteolytic enzymes. Examination of the two products shows that the non-enzyme treated material exhibits the clumping of the meat protein and excessive separation of serum and fat. The enzyme treated product does not exhibit any separation of fat and moisture and shows no evidence of clumping, thereby indicating that syneresis is negligible. The treated shelf-stable meat spread exhibits no separation of the meat components due to contraction and clumping of the meat protein during heating.

EXAMPLE VIII

*Meat spread*

A ham spread is prepared from 75 lbs. of cured smoked ham, 50 lbs. of fat, 24 lbs. of water, 1 lb. of sugar, and 8.5 grams sodium nitrite. The ham, fat, water, sugar and nitrite are comminuted in a silent chopper. An amount of an aqueous solution of trypsin sufficient to furnish 50 mg. of enzyme per pound and an aqueous solution of bromelin likewise sufficient to furnish 50 mg. of enzyme per pound of final product is added and the mixture is chopped to a fine particle size. The aqueous-ham slurry is placed in a water-jacketed kettle and heated to 140° F. under continuous agitation. The meat slurry is held at this temperature for approximately two hours. At the end of the treating period the emulsion is filled into glass jars, vacuum sealed and sterilized by placing in a retort at 235° F. under thirty pounds pressure and held there for 45 minutes. The smooth homogeneous product has a protein content of 12%, fat content of 32.1%, moisture content of 51.3%. Of the total nitrogen 40% is in heat-soluble form.

EXAMPLE IX

*Meat spread*

A pork and beef barbecue spread is prepared from 20 lbs. of pork, 6 lbs. 11 oz. of beef, 6 lbs. 11 oz. of water, with sugar, salt, nitrate, nitrite, vinegar, catsup, mustard, chili powder, celery seed and onion powder added as flavoring ingredients. All of the ingredients are comminuted to a medium fine particle size and the finished aqueous meat slurry is then placed in a water-jacketed kettle and heated to a temperature of 140° F. under continuous agitation. The proteolytic enzyme P–11, a fungal proteolytic enzyme, is added to the slurry at the level of 400 mg. per pound of meat while the product is being heated to 140° F. When the product has been held for about one and a half hours at this temperature it is again comminuted, deaerated, filled into glass containers, vacuum sealed, and sterilized by retorting at 235° F. for fifty minutes. The composition of the finished product is 12.5% protein, 31.9% fat, and 51.5% water, with 38% of total nitrogen as heat-soluble form.

The meat spreads of Examples VII, VIII, and IX have not been heretofore obtainable in shelf stable form. These products have all of the characteristics of meat spreads that have been obtainable formerly only by low temperature treatments which do not coagulate the meat proteins and must be kept under refrigeration.

EXAMPLE X

*Strained chicken*

One hundred pounds of chicken bones are placed in an equal quantity of water and a 5% aqueous solution of papain is added to the total mass at the rate of 25 mg. of papain per pound of mixture. The mixture is heated to a temperature within the range of 160–170° F. and maintained at this temperature for a period of from thirty to sixty minutes under constant agitation. During this treatment the meat becomes detached from the bones by enzymic action. At the end of the treatment period the mixture is then heated to boiling and maintained at that temperature for approximately twenty minutes. This latter heating step arrests any further enzymic activity of the enzyme. The meat particles suspended in the liquid are then separated from the bones in a settling tower where the bones gravitate to the bottom, leaving the meat, water and fat in the upper layer. Gross separation of the meat-water slurry is effected and excess moisture separated from the meat particles by centrifugation. The fibrous meat particles may be used in the preparation of comminuted meat items or may be dehydrated and stored for further utilization in food items. In this example, approximately 60 lbs. of wet meat is recovered from the original bones. Analysis shows the product contains 20% protein, 7% fat, and 72% moisture with 1% ash. One-half of this mass is then dehydrated for use in subsequent experiments.

To 10 lbs. of the moist product recovered from the bones by the above treatment is added 10 lbs. of water to form an aqueous meat slurry. This slurry is de-aereated and packed in a glass container and retorted at 235° F. for 70 minutes to yield a shelf-stable, semi-fluid, strained, comminuted meat product. Analysis shows 10% protein, 3.5% fat, 86% moisture, and about 28% of the total nitrogen is in heat-soluble form. After sterilization by retorting, samples are stored at room temperature and at 100° F. for a period of thirty days. At the end of the storage period visual examination of the samples discloses no separation of fat or moisture and that the product is homogeneous, smooth and free of bitter flavors.

EXAMPLE XI

*Meat for babies*

Three hundred pounds of boneless meat containing 25 mg. of papain per pound was obtained from a beef carcass which had been treated by the ante-morten injection process of U.S. application Serial No. 476,832, and was roasted at 325° F. for five hours. Analysis of the meat at the end of the roasting period indicated no significant enzymic activity of the papain following the roasting. The roasted meat was comminuted in a rotary hammer mill through a screen having openings of 0.033 inch. The resulting mixture was deaerated and placed in glass jars and then sterilized by retorting at 235° F. for 75 minutes. Analysis of the product shows that it contains 22.3% protein, 4.7% fat, and 72.6% moisture. Samples stored at room temperature for a period of 60 days show on visual examination that the comminuted meat suspension is homogeneous without separation of fat or moisture. The finely divided meat particles are still in good suspension. Control samples of beef treated in the same manner but without the enzyme present in the meat at the time of roasting show that the meat particles have clumped together during the processing period. At the end of the storage period a substantial syneresis is evidenced by contraction of the meat particles in the product not containing enzyme. This shows that it is possible to effectively utilize proteolytic enzymes in extremely small quantities to modify the natural characteristics of proteins when such proteins are subsequently subjected to elevated temperatures such as occur in sterilization. In this example we have taken meat and subjected it to the controlled action of papain by incorporating an extremely small quantity of 25 mg. per pound and subjecting the meat containing the enzyme to temperatures which activate the enzymic action of the enzyme and at the same time arrest the action. During the roasting period, there is a continuous activation and inactivation of the enzyme in the meat as the heat penetrates through the cut. Initially the enzyme in that part of the roast near the surface is activated and as the temperature increases is inactivated. As heat penetrates to the interior of the roast the enzyme at various depths in the meat is first activated and then inactivated. At no time is there evidence of any material disintegration of the meat particles which is best represented by the flavor of the treated meat. The finished products obtained by this treatment are mild and have a typical roasted flavor. Organoleptic analysis of the product indicates that hydrolysis or material disintegration of the meat has not occurred. The finished product is homogeneous and semi-fluid in consistency.

EXAMPLE XII

Dog food

The preparation of a ham or meat canned dog food which is characterized by a fluid consistency yet has coarsely granular meat particles therein for feeding with cereal products is possible by the utilization of proteolytic enzymes to modify the coagulation characteristics of meat proteins. Papain in an aqueous 5 percent solution is added at the rate of 150 mg. per pound of meat during the comminution thereof at 80° F. After comminution, the mix is deaerated, canned, and retorted at 265° F. for 60 minutes. The finished product containing the papain has fluidity with discrete granular meat particles distributed throughout without separation of fat and serum. Product made from the same raw materials without the enzyme additive had clumped into a solid mass and the fat and serum had separated from the coagulated meat particles. The untreated material is unsuitable for admixing with other dry cereal type dog foods for feeding dogs whereas the product made by the instant example is suitable for such feeding.

EXAMPLE XIII

To further illustrate the stabilizing effect of minor amounts of proteolytic enzymes in canned comminuted meat items a series of experimental lots were prepared wherein lean meat was ground through a ¼ inch plate, then chopped in a silent cutter for 5 minutes, during which time enzyme was added. The lean comminuted meat containing the enzyme was then placed in flat pans in a layer of about 2 inches in depth and heated in an autoclave at 100–105° C. for 1 hour. In some of the lots the meat was then chopped with additional amounts of water and/or fat in a silent cutter. Subsequent to the chopping operation, the product was milled through a size 00 strainer, deaerated, canned and retorted at about 235° F. for 70 minutes. The type and quantity of enzyme used in the experimental lots, along with the moisture fat protein compositions of the finished products and the stability results are indicated in Table I:

TABLE I

| Meat Product Composition | | | Enzyme | Dose mg./lb. Meat | Heat Soluble N₂, Percent of Total N₂ |
|---|---|---|---|---|---|
| Protein | Fat | Moisture | | | |
| 5.6 | 1.2 | 92.1 | Papain | 10–150 | 22–44 |
| 7.4 | 1.6 | 89.2 | Bromelin | 150 | 34 |
| 4.1 | 2.4 | 85.3 | Ficin | 50 | 43 |
| 5.2 | 8.6 | 85.6 | Papain | 50 | 35 |
| 10.6 | 7.3 | 81.0 | Bromelin | 30 | 28 |
| 10.6 | 23.2 | 65.0 | P-11 | 30–450 | 23–38 |
| 9.3 | 32.9 | 56.7 | P-15 | 40–500 | 25–48 |
| 8.8 | 35.9 | 54.2 | HT-200 | 1500 | 39 |
| 8.3 | 39.7 | 50.8 | Papain | 10–150 | 21–40 |
| 7.7 | 32.7 | 58.5 | Bromelin | 25 | 22 |
| 7.3 | 35.6 | 56.0 | P-15 | 100–600 | 27–45 |
| 6.6 | 41.4 | 50.6 | Trypsin | 1,000 | 26 |
| 4.4 | 41.0 | 53.2 | Papain | 50–150 | 32–45 |
| 12.5 | 39.8 | 47.0 | Bromelin | 150 | 35 |
| 12.1 | 38.5 | 48.2 | Ficin | 25 | 30 |
| 11.4 | 36.4 | 51.1 | HT-200 | 1,500 | 40 |
| 10.7 | 34.2 | 53.9 | Trypsin | 1,500 | 30 |
| 14.5 | 38.1 | 46.2 | Papain | 150 | 46 |

P-11 is a proteolytic enzyme of fungal origin.
P-15 is a proteolytic enzyme derived from mold grown on bran.
HT-200 is a proteolytic enzyme of bacterial origin.

A desirable range in the amount of enzyme to be added while maintaining reasonable heating times and processing temperatures is about 1–150 mg. enzyme per pound of meat. While this range is not necessarily optimum or effective for all enzymes (see Table I), it is a very satisfactory guide, particularly where the common plant-derived proteolytic enzymes are employed.

It will be noted that under the conditions of the treatment of this example various types of proteolytic enzymes and in various quantities have a very significant stabilizing effect upon the moisture-fat-protein stability of the product which may be then formulated in any of a number of ways in the amounts of moisture, fat, and protein contained therein.

Considerable latitude for variations in the examples is possible by describing the incorporation of each of the proteolytic enzymes specifically named hereinbefore in comminuted meat products. Such exemplification would be repetitive, and the above examples are considered sufficient to illustrate the products of the invention and methods for their preparation. It is to be understood that the time and temperature of treatment, the type and concentration of and mode of incorporating the proteolytic enzyme are all variable and may be adjusted at will to secure the desired alterations in the physical-chemical properties of canned comminuted meats of the fluid, semi-fluid, and spreadable types.

By the term "meat and meat products" we mean animal meat, skeletal and organ tissue, including the meat of poultry, fish, and other seafoods.

Nitrogen in heat soluble form as used in this specification and claims means that nitrogen fraction of the total nitrogen which is soluble in water after heat coagulation of the meat protein.

We have found that when the heat soluble nitrogen is present in the comminuted canned meat product in an amount ranging from about 21% to 50% of the total nitrogen as a result of enzyme treatment there will be a substantial improvement in the stability of the canned meat product against the syneresis effect when the meat product is subjected to heat. We prefer that the enzyme be active until the amount of heat soluble nitrogen in the product is within the range of 25 to 40%. The amount of heat soluble nitrogen is assayed by the procedure of F. C. Koch and T. L. McMeekin, Journal of the American Chemical Society, volume 46, page 2066 (1924).

In this specification the term "comminuted" is used to describe any food product that is chopped, ground, shredded, milled, or otherwise subdivided during preparation of the aqueous-meat suspension.

While we have given examples of treatment which we have found useful and effective, it should be understood that they are merely examples and our invention is not limited to any particular character or quantity of enzymes, the invention residing broadly in the concept of using proteolytic enzymes to produce new canned comminuted meat products and to stabilize aqueous meat suspensions against syneresis.

From the foregoing discussion it is evident that the new canned comminuted meat products have a marked improvement in consistency, homogeneity, and stability of structure, with substantially no separation of serum or fat, and that the products may be served and consumed easily and conveniently. Also, we have provided new and novel methods for stabilizing canned comminuted meats.

By meat emulsion we mean comminuted meat in the natural meat juices or which contains added fat or moisture. The term includes comminuted meat compositions varying from substantially fluid solids containing products which will pass through a straw to coarse granular materials such as dog food. Also included are plastelike products which are spreadable. All of these materials contain moisture and/or fat which may separate from the meat solids.

Obviously many modifications and variations of the invention hereinbefore set forth may be made without departing from the spirit and scope thereof, and therefore only such limitations should be imposed as are indicated in the appended claims.

We claim:

1. The method of processing a comminuted meat product comprising: subjecting the meat to the action of a proteolytic enzyme in an amount from about 1 to about 1500 mg. per pound of said meat at a temperature within the range from about 50 to about 210° F. at which the enzyme is active, maintaining said temperature for a sufficient period of time to stabilize said meat, arresting the action of said enzyme prior to material disintegration of said meat and comminuting said meat to form a comminuted meat product.

2. A comminuted meat product produced by the process of claim 1.

3. A process for producing a stable homogeneous fluid meat product containing at least 70% moisture comprising: subjecting the meat to the action of a proteolytic enzyme in an amount of from about 1 to about 1500 mg. per pound of said meat, heating said meat to a temperature within the range from about 50 to about 210° F. at which the enzyme is active, and maintaining said temperature for a period of time sufficient to stabilize the said meat mixture, but insufficient to cause sufficient disintegration of said meat to result in unpleasant and bitter flavors.

4. A stable homogeneous fluid meat product produced by the process of claim 3.

5. A process for producing a comminuated meat product with a high fat content of at least 25% comprising: subjecting said meat to the action of a proteolytic enzyme in an amount from about 1 to about 1500 mg. per pound of said meat at a temperature within the range from about 50 to about 210° F. at which the enzyme is active; maintaining said temperature for a sufficient period of time to stabilize said meat product, and arresting the action of said enzyme prior to the material disintegration of said meat.

6. A comminuted meat product produced by the process of claim 5.

7. A process for stabilizing comminuted meats which comprises the steps of: contacting meat with an amount from about 1 to about 1500 mg. per pound of said meat of a proteolytic enezyme material capable of stabilizing said meat; heating said meat to a temperature within the active range of said enzyme; maintaining said temperature for a time from about ten minutes to about two hours which is sufficient to stabilize said meat without material disintegration thereof.

8. A process for producing a stable comminuted meat product which comprises the steps of: forming a mixture of comminuted meat and enzyme to provide a product having a proteolytic enzyme activity in excess of that normally present in meat; heating said mixture to a temperature within the range from about 50 to about 210° F. at which the enzyme is active; maintaining said temperature for that period of time within the range from about ten minutes to about two hours at which said meat is stabilized and the heat-soluble nitrogen in said meat is increased to a value of from about 21 to about 50% of the total nitrogen; and arresting the action of said enzyme.

9. A process of canning meats which comprises the steps of: admixing meat with a protetolytic enzyme in the amount from about 1 to about 1500 mg. per pound of said meat; activating said enzyme by heating the mixture of meat and enzyme to a temperature within the range from about 50 to about 210° F. at which said enzyme is active; agitating the heated mixture at said temperature while holding for a short time sufficient to stabilize the said mixture, but insufficient to cause material disintegration of said meat; arresting the action of said enzyme to prevent further disintegration of said meat; recomminuting said comminuted meat mixture to the desired meat particle size; sealing the recomminuted product in a container; and then sterilizing the product in the container.

10. In the process for preparing shelf-stable comminuted meats wherein the product is cooked, comminuted to the desired particle size, canned, and sterilized, the improvement comprising: subjecting the meat to the action of a proteolytic enzyme material, said enzyme being present in an amount from about 1 to 150 mg. per pound of meat, cooking said meat within a temperature range of active enzyme action from about 50 to about 210° F. for a period of time from about ten minutes to about two hours sufficient so as to stabilize said meat by increasing the percent of nitrogen in heat-soluble form to a value of from about 25 to about 45% of the total nitrogen and arresting the action of said enzyme.

11. A process for producing a stable comminuted meat product which comprises the steps of: forming a mixture of meat and papain to provide a product having a proteolytic enzyme activity in excess of that normally present in meat; heating said mixture to a temperature within the range from about 50 to about 210° F. at which the enzyme is active; maintaining said temperature for that period of time within the range from about ten minutes to about two hours at which said meat is stabilized and the heat-soluble nitrogen in said meat is increased to a value of from about 21 to about 50% of the total nitrogen; and arresting the action of said enzyme.

References Cited in the file of this patent

UNITED STATES PATENTS

| | | |
|---|---|---|
| 2,464,200 | Hall | Mar. 15, 1949 |
| 2,753,269 | Hawk et al. | July 3, 1956 |
| 2,820,709 | Schack et al. | Jan. 21, 1958 |
| 2,825,650 | Shahrok | Mar. 4, 1958 |
| 2,860,992 | Voegeli et al. | Nov. 18, 1958 |
| 2,860,993 | Maher | Nov. 18, 1958 |